R. A. BROWN & J. PITTINGS.
DRILL ATTACHMENT.
APPLICATION FILED MAR. 31, 1910.
977,267.
Patented Nov. 29, 1910.
2 SHEETS—SHEET 2.
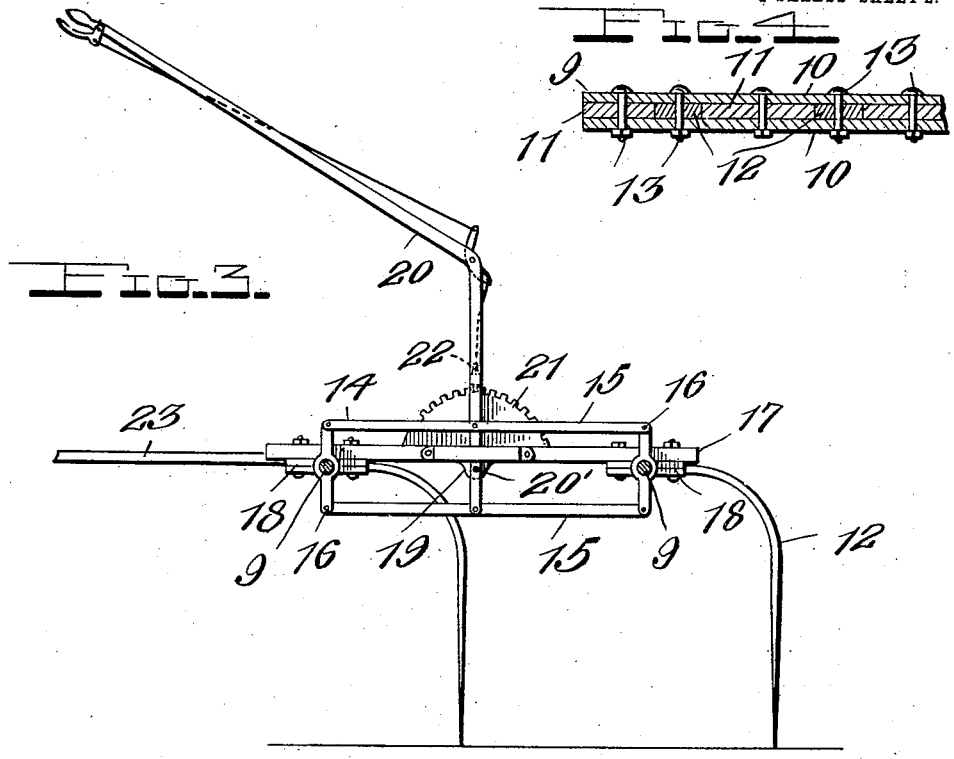
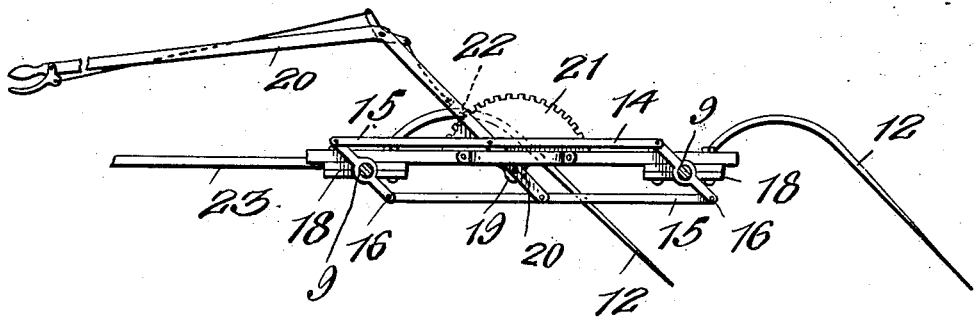
Witnesses
Chas. L. Griesbauer.
E. M. Ricketts
Inventors
R. A. Brown and
J. Pittings,
By Watson E. Coleman.
Attorney

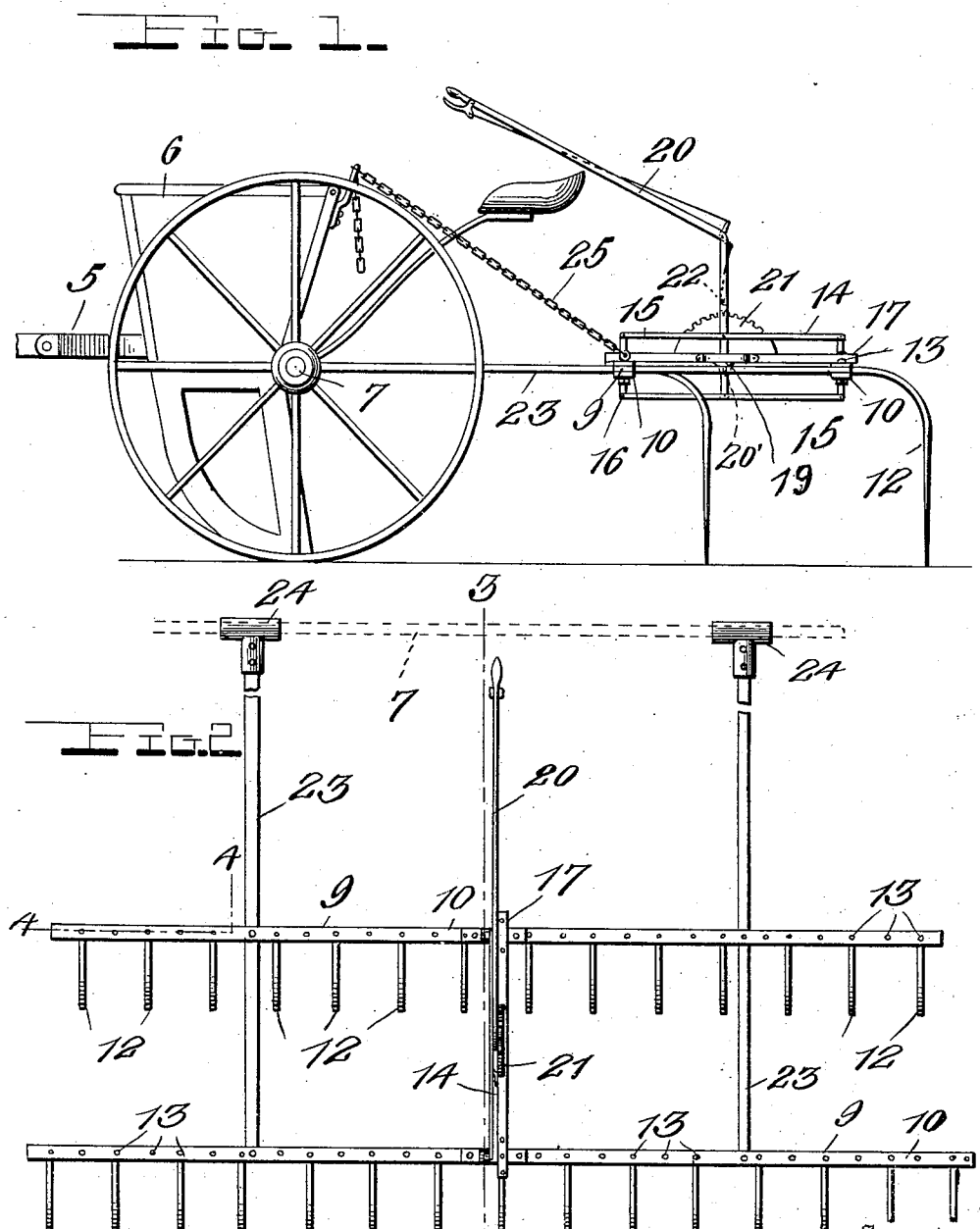

UNITED STATES PATENT OFFICE.

ROBERT A. BROWN AND JOHN PITTINGS, OF ANTLER, NORTH DAKOTA.

DRILL ATTACHMENT.

977,267.  Specification of Letters Patent.  Patented Nov. 29, 1910.

Application filed March 31, 1910. Serial No. 552,567.

*To all whom it may concern:*

Be it known that we, ROBERT A. BROWN and JOHN PITTINGS, citizens of the United States, residing at Antler, in the county of Bottineau and State of North Dakota, have invented certain new and useful Improvements in Drill Attachments, of which the following is a specification, reference being had to the accompanying drawings.

This invention relates to certain new and useful improvements in grain drill attachments and has for its object to provide a simple and efficient device whereby the seed after being deposited may be covered with the soil.

Another object is to provide an attachment for planters or grain drills comprising a frame carrying a plurality of soil engaging teeth, and means whereby said teeth may be adjusted in the frame to an inoperative or operative position.

A further object resides in the provision of a device of the above character which is strong and durable in construction, is capable of attachment to any of the various forms of drills or planters and may be produced at a low cost.

With these and other objects in view, the invention consists of the novel features of construction and the combination and arrangement of parts hereinafter fully described and claimed, and illustrated in the accompanying drawings, in which—

Figure 1 is a side elevation of a grain drill illustrating the application of our attachment thereto; Fig. 2 is a top plan view of the attachment removed; Fig. 3 is an enlarged section taken on the line 3—3 of Fig. 2; Fig. 4 is a section taken on the line 4—4 of Fig. 2; and Fig. 5 is a view similar to Fig. 3 showing the teeth raised or in inoperative position.

Referring more particularly to the drawings 5 indicates a drill or planting machine which may be of any approved form and comprises a grain box 6 mounted upon the wheel axle 7, said axle having the ground wheels 8 secured to its ends in the usual manner.

Our improved attachment consists of the parallel teeth carrying bars 9, each of which comprises the spaced plates 10, said plates having arranged between them a plurality of blocks 11. Between the ends of adjacent blocks, the earth engaging teeth 12 are arranged, said blocks and the teeth being secured between the plates 10 by means of the bolts or analogous fastening devices 13.

The teeth carrying bars 9 are connected at one side of their center by means of an elongated frame 14. This frame is in the form of a parallelogram and the bars 15 thereof are pivotally connected, as shown at 16. The vertical end bars of the frame 14 are rigidly secured to the spaced plates 10 between which the teeth 12 are arranged. A longitudinal bar 17 is disposed adjacent to the frame 14 and has a bearing 18 secured to each end thereof. In these bearings 18, the teeth carrying bars 9 are mounted and are adapted to be rotated to elevate the teeth above the ground surface. This bar is centrally formed with a depending lug 19 upon which an adjusting lever 20 is pivoted. The pivot point 20' of this lever is in the same longitudinal plane as the bearings 18. The lever 20 is also pivotally connected upon opposite sides of the bar with the upper and lower longitudinal frame bars 15, as clearly shown in Fig. 3. A rack segment 21 is carried by the bar 17 and is traversed by the lever 20, said lever carrying the usual spring controlled pawl 22 for engagement with the teeth of said segment. The lever 20 is of substantially L-shaped form and extends forwardly to a position adjacent to the driver's seat so that it may be readily grasped and manipulated. The ends of the parallel teeth carrying bars 9 are supported by means of the rods or bars 23 which extend forwardly to the wheel axle 7. The forward ends of these rods are provided with the sleeves or bearings 24 which are disposed upon the axle, said sleeves being freely movable thereon. Chains 25 have their lower ends connected to the rods 23 and the grain box 6 is provided with hooks with which the links of the chain are adapted to engage whereby the teeth carrying bars may be raised or lowered as desired.

When it is desired to elevate the teeth 12 out of engagement with the soil, the operator grasps the lever 20 and pulls the same forwardly. Upon this forward movement of the lever the elongated frame 14 will be folded or collapsed, as shown in Fig. 5, and as the ends of said frame are rigidly connected to the teeth carrying bars it will be obvious that the teeth will be elevated, said frame bars being disposed at an angle between the ends of the parallel longitudinal bars of said frame. While any desired form of cultivator teeth may be utilized in carrying out our invention, we preferably form the same from resilient bars of steel, said teeth tapering at a point at their extremities. It will be noted upon reference to Fig. 2 that the teeth carried by the bars 9 are staggered, or in other words, the teeth carried by one of said bars are disposed in a plane between the teeth carried by the other bar whereby the soil will be thoroughly disturbed to insure the covering of the seed which have been previously deposited by the drill. The earth is also loosened and pulverized by the teeth as the machine moves over the ground, which will insure a larger crop from the amount of seed planted. The chains 25 are given sufficient slack to compensate for the unevenness of the ground surface, and by adjusting the teeth they may be caused to enter the soil to any desired depth.

From the foregoing it is believed that the construction and operation of our improved drill attachment will be readily understood without requiring any further description. The device is extremely simple and is capable of use in connection with any of the various forms of seed drills or planters. The use of drag chains which is the means commonly employed for covering the seed is entirely eliminated, and a device provided which will more efficiently effect this purpose with but slight additional expense. The proportions of the device may be altered as desired to adapt the same for use in connection with drills of any capacity. Some machines of this character are provided with twenty or thirty seed directing chutes. The attachment is also susceptible of a great many other minor modifications without materially departing from the essential features or sacrificing any of the advantages thereof.

Having thus described the invention what is claimed is:

1. A drill attachment of the character described comprising parallel teeth carrying bars, rods connecting said bars adjacent to their ends, an elongated frame connecting the bars at their centers, said frame consisting of parallel longitudinal bars and connecting bars pivoted to the ends of said longitudinal bars, a longitudinal bar having bearings thereon to receive the teeth carrying bars, the longitudinal bars of the frame being disposed upon opposite sides of said last named bar, the connecting rods of said frame being rigidly secured upon the teeth carrying bars intermediate of their ends, an ear depending from said bar, and an operating lever pivoted to each of said longitudinal frame bars and to said ear centrally betweeen said frame bars, said lever being adapted to collapse said frame and rotate the teeth carrying bars to elevate the teeth.

2. A drill attachment comprising parallel teeth carrying bars, rods connecting said bars adjacent to their ends adapted for attachment to the axle of the drill, a collapsible frame connecting said bars adjacent to their centers, a longitudinal bar having a bearing secured to each of its ends to receive the teeth carrying bars, and a lever mounted upon said longitudinal bar and connected to the frame adapted to adjust the same and rotate the bars in said bearings to elevate the teeth to an inoperative position.

3. A grain drill attachment comprising a plurality of teeth carrying bars, rods connecting said bars adjacent to their ends and loosely mounted upon the drill axle, an elongated rectangular frame connecting the teeth carrying bars, the ends of the frame bars being pivotally connected, a longitudinal bar having bearings arranged thereon to receive the teeth carrying bars, and an operating lever pivotally connecting said longitudinal bar and the frame bars, the adjustment of said lever being adapted to collapse said frame and rotate the teeth carrying bars to elevate the teeth.

4. A drill attachment of the character described comprising parallel teeth carrying bars, rods connecting said bars to the drill shaft, said bars being rotatably carried by the rods, a collapsible frame connecting said bars adjacent to their centers, a longitudinal bar arranged adjacent to said frame having bearings secured thereto to receive the teeth carrying bars, a rack segment secured on said longitudinal bar, and an adjusting lever pivoted to said longitudinal bar and the frame bars, the adjustment of said lever being adapted to collapse the frame and rotate the teeth carrying bars in their bearings to elevate the teeth to an inoperative position.

In testimony whereof we hereunto affix our signatures in the presence of two witnesses.

ROBERT A. BROWN.
JOHN PITTINGS.

Witnesses:
J. R. PATTERSON,
C. J. SMITH.